United States Patent
Tsuzaki et al.

(10) Patent No.: US 7,046,428 B2
(45) Date of Patent: May 16, 2006

(54) RAMAN AMPLIFIER

(75) Inventors: Tetsufumi Tsuzaki, Yokohama (JP); Kiyotaka Murashima, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/885,046

(22) Filed: Jul. 7, 2004

(65) Prior Publication Data
US 2004/0240039 A1 Dec. 2, 2004

Related U.S. Application Data

(62) Division of application No. 09/908,853, filed on Jul. 20, 2001, now Pat. No. 6,775,055.

(30) Foreign Application Priority Data

Jul. 21, 2000 (JP) .......................... P2000-220967

(51) Int. Cl.
*H01S 3/00* (2006.01)
(52) U.S. Cl. .................................. 359/334
(58) Field of Classification Search ............... 359/334, 359/341.31
See application file for complete search history.

(56) References Cited

U.S. PATENT DOCUMENTS

| | | |
|---|---|---|
| H499 H | 7/1988 | Lin ............................. 359/333 |
| 5,920,423 A | 7/1999 | Grubb et al. .......... 359/341.33 |
| 6,115,174 A | 9/2000 | Grubb et al. ................ 359/334 |
| 6,144,486 A | 11/2000 | Bennett et al. ........ 359/337.13 |
| 6,282,002 B1 | 8/2001 | Grubb et al. ................ 398/157 |
| 6,292,288 B1* | 9/2001 | Akasaka et al. ............. 359/334 |
| 6,356,383 B1 | 3/2002 | Cornwell et al. ............. 359/334 |
| 6,417,959 B1 | 7/2002 | Bolshtyansky et al. ..... 359/334 |
| 6,433,921 B1* | 8/2002 | Wu et al. .................... 359/334 |
| 6,480,326 B1 | 11/2002 | Papernyl et al. ............. 359/334 |
| 6,512,628 B1* | 1/2003 | Terahara et al. ............. 359/334 |
| 6,611,370 B1* | 8/2003 | Namiki et al. ............... 359/334 |
| 6,681,079 B1* | 1/2004 | Maroney ...................... 398/15 |
| 6,687,426 B1* | 2/2004 | May et al. ..................... 385/15 |

(Continued)

FOREIGN PATENT DOCUMENTS

EP 0 812 078 9/1999

(Continued)

OTHER PUBLICATIONS

Yoshihiro Emori, and Shu Namiki, "100nm Bandwidth Flat Gain Raman Amplifiers Pumped and Gain-Equalized by 12-Wavelength-channel WDM High Power Laser Diodes, "OFC'99, 1999, PP. PD19-1-PD9-3.

(Continued)

*Primary Examiner*—Deandra M. Hughes
(74) *Attorney, Agent, or Firm*—McDermott Will & Emery LLP

(57) ABSTRACT

Raman amplification pumping light output from a pumping light source unit is supplied to a Raman amplification optical fiber through an optical circulator. The remaining Raman amplification pumping light is detected by a light-receiving element through an optical circulator and bandpass filter. Signal light that has reached a Raman amplifier propagates through the Raman amplification optical fiber while being Raman-amplified. A control section controls the power or spectral shape of Raman amplification pumping light output from each of N pumping light sources included in the pumping light source unit on the basis of the power of the remaining Raman amplification pumping light, which is detected by the light-receiving element. Hence, a Raman amplifier capable of easily controlling gain spectrum flattening in the signal light wavelength band can be obtained.

10 Claims, 10 Drawing Sheets

U.S. PATENT DOCUMENTS

2001/0050802 A1    12/2001    Namiki et al. ......... 359/337.11

FOREIGN PATENT DOCUMENTS

| EP | 0 944 190 | 9/1999 |
|---|---|---|
| EP | 1 018 666 | 7/2000 |
| JP | 2000-98433 | 4/2000 |
| WO | WO 02/07274 A2 | 1/2002 |

OTHER PUBLICATIONS

F. Koch, S.A.E. Lewis, S.V. Chernikov, and J.R.Taylor, "Broadband Gain Flattened Raman Amplifier To Extend Operation In The Third Telecommunication Window," OFC'2000, THD, PP. FF3-1-FF3-3.

Emori et al, OFC 2000, Mar. 7-10, 2000.

Masuda et al, "1.65 um band fibre Raman amplifier pumped by wavelength-tanable amplified spontaneous emission light source" Elect. Lett. 34:24, Nov. 26, 1998, pp. 2339,2340.

Emori Y. et al., "100 nm bandwideth flat-gain Raman amplifiers pumped and gain-equalised by 12-wavelegth-channel WDM laser diode unit", Electronic Letters Aug. 5, 1999, vol. 35, No. 16.

Matsuda H. et al., "1.65 m band fibre Raman amplifier pumped by wavelength-tunable amplified spontaneous emission light source", Electronics Letters, Nov. 26, 1998, vol. 34, No. 24.

* cited by examiner

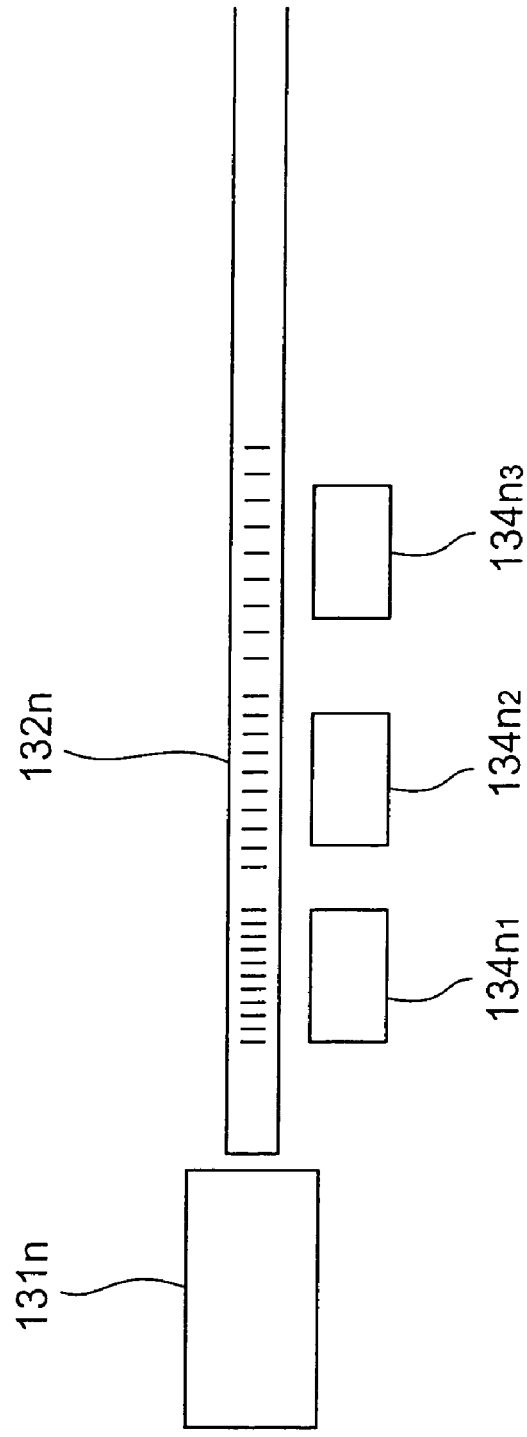

RAMAN AMPLIFIER

This application is a divisional of application Ser. No. 09/908,853 filed Jul. 20, 2001, now U.S. Pat. No. 6,775,055.

BACKGROUND OF THE INVENTION

1. Field of the Invention

The present invention relates to a Raman amplifier for compensating for, by Raman amplification, a transmission loss generated in an optical communication system for executing communication using signal light when signal light is transmitted through the optical transmission path.

2. Related Background Art

In an optical communication system for executing communication using signal light, signal light output from the transmitter and transmitted through the optical transmission path suffers a transmission loss. Hence, the signal light that has reached the receiver has a small power. If the power of the signal light that has reached the receiver has a predetermined value or less, normal optical communication may be impossible because of a reception error. To prevent this problem, an optical amplifier is inserted between the transmitter and the receiver to optically amplify signal light, thereby compensating for the transmission loss generated when the signal light is transmitted through the optical transmission path.

Examples of such an optical amplifier are a rare-earth-element-doped optical fiber amplifier (e.g., Er-doped optical fiber amplifier) that uses an amplification optical fiber doped with a rare earth element and a Raman amplifier that uses a Raman amplification phenomenon in a Raman amplification optical fiber. Unlike a rare-earth-element-doped optical fiber amplifier, a Raman amplifier can obtain a desired wavelength band having a gain by appropriately setting the wavelength of pumping light for Raman amplification.

For a WDM (Wavelength Division Multiplexing) optical communication system for executing optical communication by multiplexing signal light components with multiple wavelengths in a predetermined signal light wavelength band, it is important that the gain spectrum of an optical amplifier in that signal light wavelength band is flat. Otherwise, even when a signal light component having a certain wavelength in the signal light wavelength band can be normally received by the receiver, another signal light component having a different wavelength with a small gain may cause a reception error. A technique for flattening the gain spectrum of a Raman amplifier has been studied.

For example, in a Raman amplifier gain flattening technique described in reference 1 "Y. Emori, et al., "100 nm bandwidth flat gain Raman amplifiers pumped and gain-equalized by 12-wavelength-channel WDM high power laser diodes", OFC'99, PD19 (1999)", light components output from N (N≧2) pumping light sources are multiplexed and supplied to a Raman amplification optical fiber as Raman amplification pumping light. The gain spectrum of the Raman amplifier is flattened by appropriately setting the output central wavelengths and output powers of the N pumping light sources. In reference 1, the number N of pumping light sources is 12.

In a Raman amplifier gain flattening technique described in reference 2 "F. Koch, et al., "Broadband gain flattened Raman amplifier to extend operation in the third telecommunication window", OFC'2000, ThD, FF3 (2000)", the gain spectrum of the Raman amplifier is flattened using a gain equalizer which has a loss spectrum with almost the same shape as that of the gain spectrum of the Raman amplification optical fiber.

SUMMARY OF THE INVENTION

However, the above conventional Raman amplifier gain flattening techniques have the following problems. In an optical communication system for executing long-distance optical communication, M (M≧2) Raman amplifiers may be required between the transmitter and the receiver. In this case, if the gain flattening technique described in reference 1 is employed, the total number of pumping light sources required in the entire optical communication system is M×N. Since the output powers of these pumping light sources must be individually controlled, the gain spectrum flattening for the Raman amplifier is hard to control.

In a Raman amplifier which employs the gain flattening technique described in reference 2, signal light is optically amplified by the Raman amplification optical fiber but attenuated by the gain equalizer. Hence, the loss spectrum of the gain equalizer must be controlled, and it is also difficult to control the gain spectrum flattening for the Raman amplifier.

The present invention has been made to solve the above problems, and has as its object to provide a Raman amplifier capable of easily controlling the gain spectrum flattening in a signal light wavelength band.

According to an aspect of the present invention, there is provided a Raman amplifier characterized by comprising (1) a Raman amplification optical fiber for transmitting signal light and Raman-amplifying the signal light by being provided Raman amplification pumping light, and (2) Raman amplification pumping light supply means, having N (N≧1) pumping light sources for outputting light having a non-unimodal spectrum, for supplying light components output from the N pumping light sources to the Raman amplification optical fiber as the Raman amplification pumping light.

According to this Raman amplifier, Raman amplification pumping light is supplied from the Raman amplification pumping light supply means having the N pumping light sources to the Raman amplification optical fiber. The signal light is transmitted through the Raman amplification optical fiber while being Raman-amplified. That is, a transmission loss generated when the signal light is transmitted through the Raman amplification optical fiber is compensated for by Raman amplification.

Especially, in this Raman amplifier, since the spectrum of a light component output from each of the N pumping light sources included in the Raman amplification pumping light supply means is non-unimodal, the number of pumping light sources can be made smaller than that in the prior art described in reference 1. Hence, the gain spectrum flattening can easily be controlled. Additionally, in this Raman amplifier, since the gain spectrum can be flattened without using any gain equalizer, the gain spectrum flattening can easily be controlled, as compared to the prior art described in reference 2.

"The spectrum is non-unimodal" means not only that a wavelength at which the output power is maximal is present independently of a wavelength at which the output power is maximum but also that the wavelengths for the maximum and maximal output powers are separated from each other by 5 nm or more. From the viewpoint of output power, "unimodal" means that in an optical spectrum obtained when the wavelength resolving power is set at 0.5 nm or more, there is no maximal peak at which the peak power difference is 5 dB or less or 10 dB or less and the wavelength difference is 5 nm or more, with respect to the peak of the maximum output power. A spectrum which does not satisfy the above conditions is "non-unimodal".

According to another aspect of the present invention, there is provided a Raman amplifier characterized by comprising (1) a Raman amplification optical fiber for transmitting signal light and Raman-amplifying the signal light by being provided Raman amplification pumping light, (2) Raman amplification pumping light supply means, having N ($N \geq 1$) pumping light sources for outputting light having a controllable (changeable) spectrum, for supplying light components output from the N pumping light sources to the Raman amplification optical fiber as the Raman amplification pumping light, and (3) control means for controlling the spectrum of the Raman amplification pumping light output from each of the N pumping light sources.

According to this Raman amplifier, Raman amplification pumping light is supplied from the Raman amplification pumping light supply means having the N pumping light sources to the Raman amplification optical fiber. The signal light is transmitted through the Raman amplification optical fiber while being Raman-amplified. That is, a transmission loss generated when the signal light is transmitted through the Raman amplification optical fiber is compensated for by Raman amplification.

Especially, in this Raman amplifier, since the spectrum of a light component output from each of the N pumping light sources included in the Raman amplification pumping light supply means is changeable and is controlled by the control means, the number of pumping light sources can be made smaller than that in the prior art described in reference 1. Hence, the gain spectrum flattening can easily be controlled. Additionally, in this Raman amplifier, since the gain spectrum can be flattened without using any gain equalizer, the gain spectrum flattening can easily be controlled, as compared to the prior art described in reference 2.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a view showing the arrangement of each pumping light source included in the pumping light source unit of the Raman amplifier;

DESCRIPTION OF THE PREFERRED EMBODIMENTS

Figure 1:
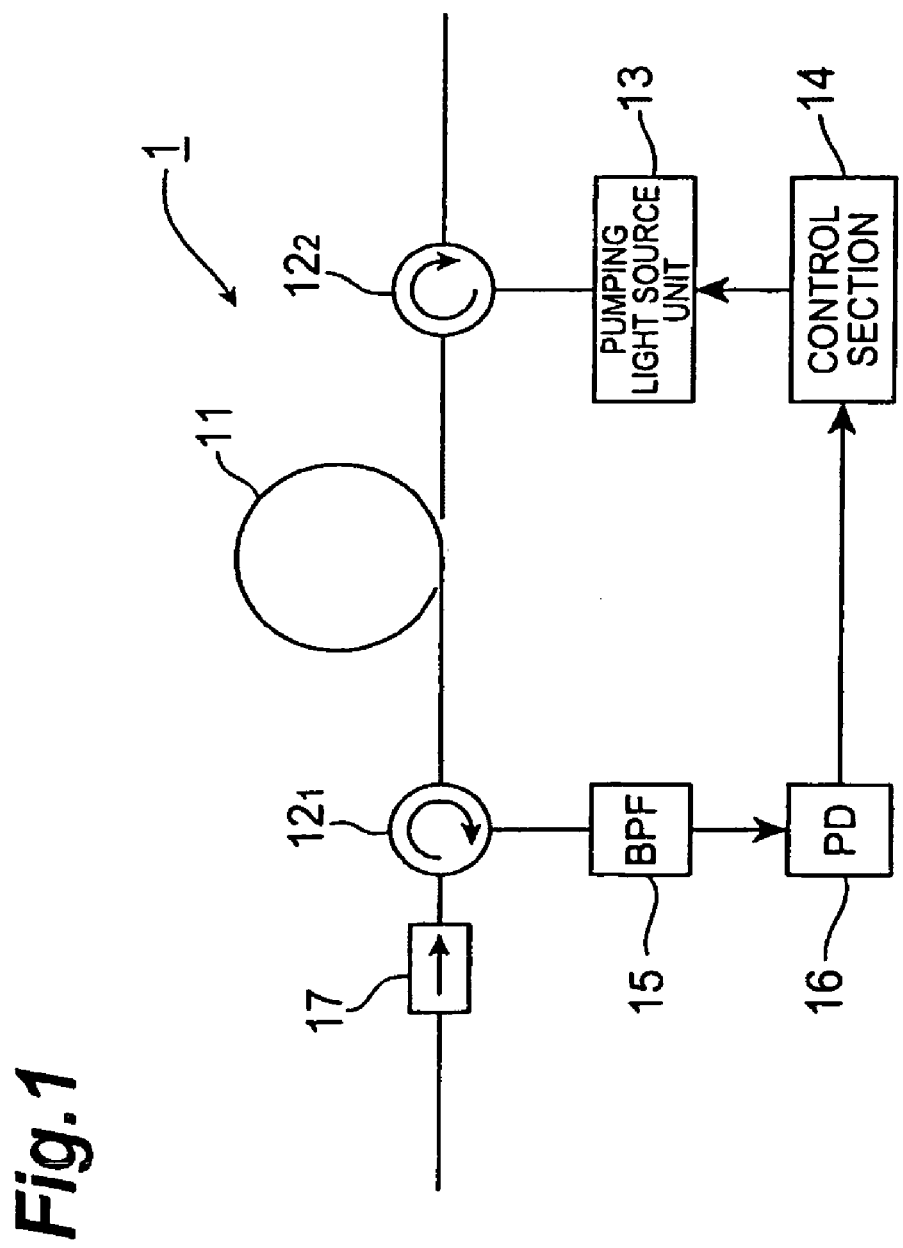
FIG. 1 is a view showing the arrangement of a Raman amplifier according to the first embodiment.

The embodiments of the present invention will be described below in detail with reference to the accompanying drawings. The same reference numerals denote the same elements throughout the drawings, and a repetitive description thereof will be omitted.

(First Embodiment)

A Raman amplifier according to the first embodiment of the present invention will be described. FIG. 1 is a view showing the arrangement of a Raman amplifier 1 according to the first embodiment. This Raman amplifier 1 comprises a Raman amplification optical fiber 11, optical circulators $12_1$ and $12_2$, pumping light source unit 13, control section 14, bandpass filter 15, light-receiving element 16, and optical isolator 17.

The Raman amplification optical fiber 11 receives Raman amplification pumping light from the optical circulator $12_2$ and transmits signal light from the optical circulator $12_1$ to the optical circulator $12_2$ while Raman-amplifying the signal light. The optical isolator 17 passes light only in the forward direction but not in the reverse direction. The optical circulator $12_1$ outputs signal light from the optical isolator 17 to the Raman amplification optical fiber 11 and outputs light from the Raman amplification optical fiber 11 to the bandpass filter 15. The optical circulator $12_2$ outputs signal light from the Raman amplification optical fiber 11 to the output side and outputs Raman amplification pumping light from the pumping light source unit 13 to the Raman amplification optical fiber 11.

The bandpass filter 15 receives signal light from the optical circulator $12_1$ and outputs a light component having a specific wavelength of the signal light. The light-receiving element 16 receives the signal light component having the specific wavelength from the bandpass filter 15 and outputs an electrical signal having a value corresponding to the light-receiving amount.

The pumping light source unit 13 has N ($N \geq 1$) pumping light sources and outputs light components output from the N pumping light sources, as Raman amplification pumping light. The spectrum of light output from each pumping light source is non-unimodal, or changeable and the spectrum can be controlled. The control section 14 controls the power or spectrum (wavelength dependence of pumping light) of Raman amplification pumping light output from the pumping light source unit 13 on the basis of the electrical signal output from the light-receiving element 16.

Figure 2:
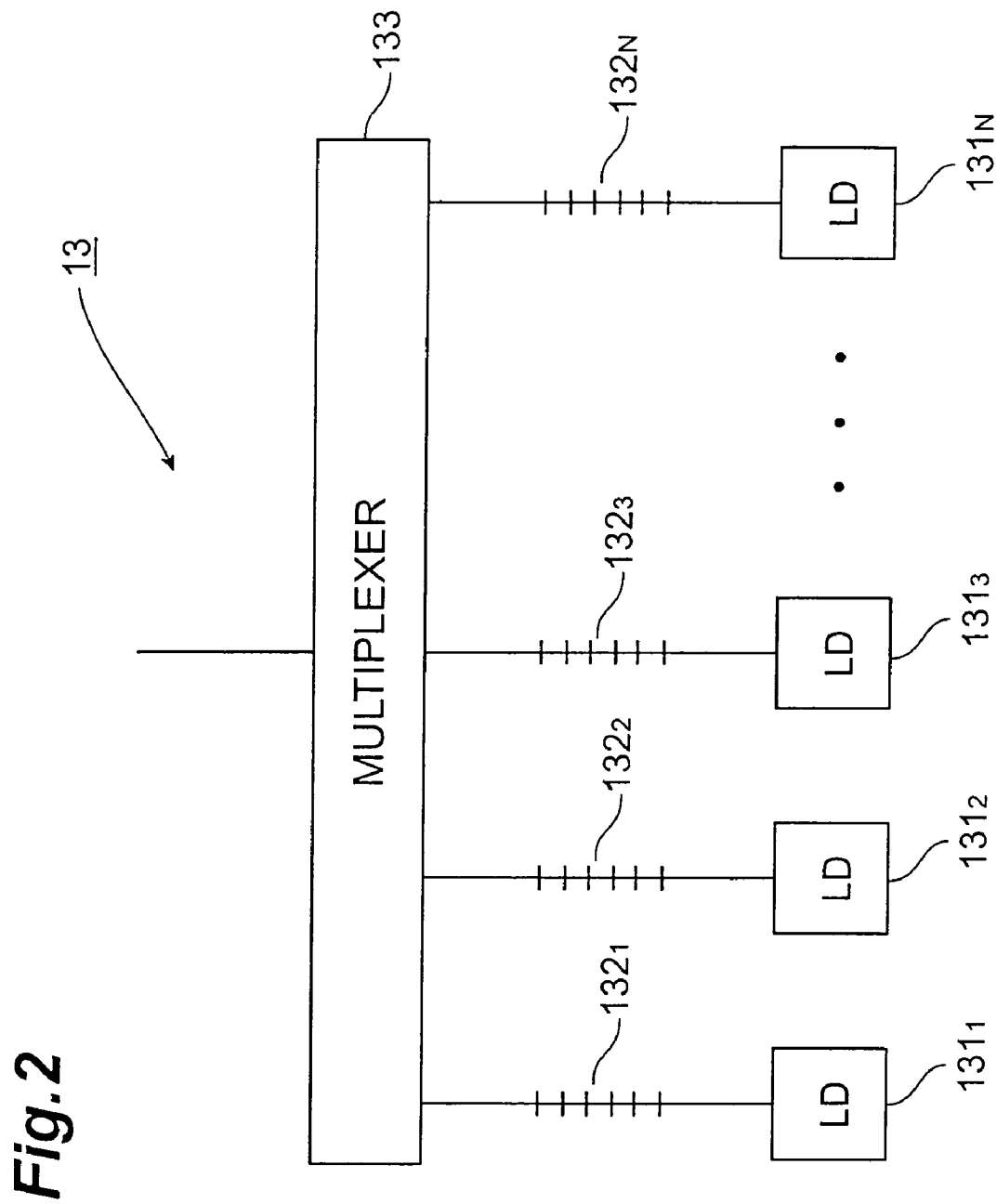
FIG. 2 is a view showing the arrangement of the pumping light source unit of the Raman amplifier.

FIG. 2 is a view showing the arrangement of the pumping light source unit 13 of the Raman amplifier 1 according to the first embodiment. The pumping light source unit 13 has N light-emitting elements $131_1$ to $131_N$, N optical fiber gratings $132_1$ to $132_N$, and a multiplexer 133. A set of a light-emitting element $131_n$ and optical fiber grating $132_n$ construct one pumping light source (n is an arbitrary integer, $1 \leq n \leq N$: this also applies to the following description). The multiplexer 133 multiplexes light components output from the N pumping light sources and outputs the multiplexed light as Raman amplification pumping light.

FIG. 3 is a view showing the arrangement of each pumping light source included in the pumping light source unit 13 of the Raman amplifier 1 according to the first embodiment. The optical fiber grating $132_n$ has an index modulation formed in the optical waveguide region of the optical fiber. The optical fiber grating $132_n$ opposes one end face of the light-emitting element $131_n$ so as to make light input/output possible while forming a resonator with the other end face of the light-emitting element $131_n$. The spectrum of light output from such a pumping light source having a resonator structure corresponds to the spectrum of spontaneous emission light in the light-emitting element $131_n$ and the reflection spectrum in the optical fiber grating $132_n$.

Figure 4A:
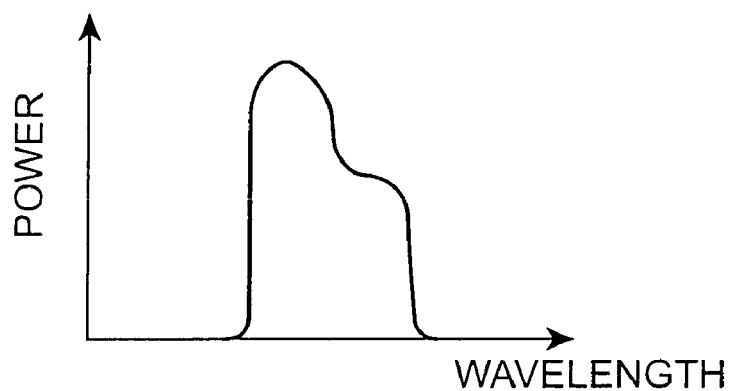
FIGS. 4A to 4C are graphs for explaining control of the output light spectrum of each pumping light source included in the pumping light source unit of the Raman amplifier.
Figure 4B:
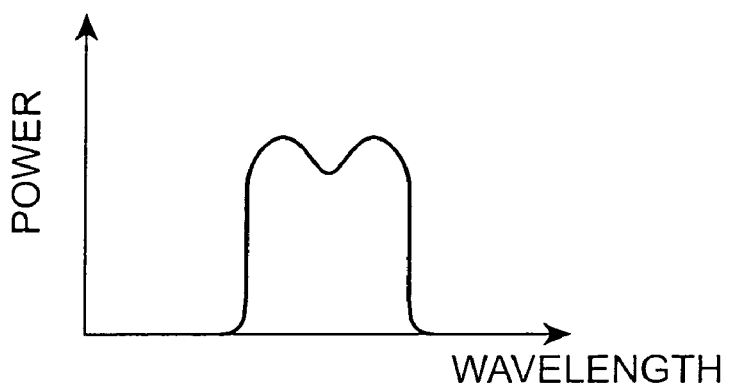
Figure 4C:
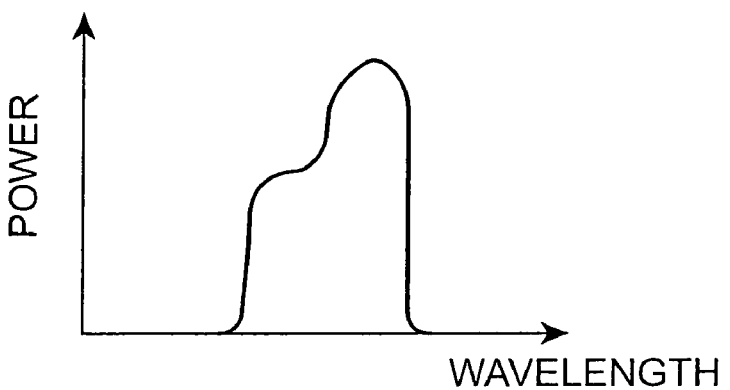

That is, when the reflection spectrum in the optical fiber grating $132_n$ is appropriately designed, the spectrum of light output from the pumping light source can be made non-unimodal. In addition, as shown in FIG. 3, when temperature adjusting means (e.g., heaters or Peltier elements) $134_{n1}$ to $134_{n3}$ are arranged to adjust the temperature of the optical fiber grating $132_n$ so as to adjust the reflection spectrum, the shape of spectrum of light output from the pumping light source can be controlled, as indicated by the examples shown in FIGS. 4A to 4C.

Figure 5A:
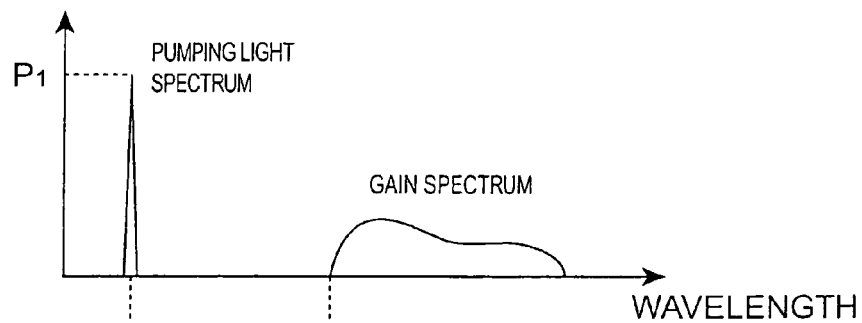
FIGS. 5A to 5D are graphs for explaining the relationship between the spectrum of Raman amplification pumping light and the gain spectrum of Raman amplification.
Figure 5B:
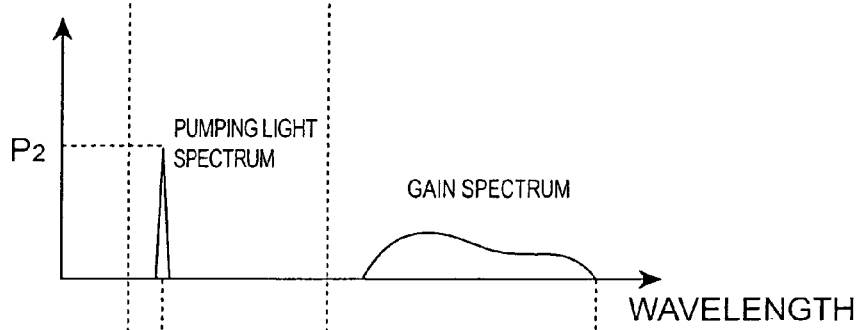

FIGS. 5A to 5D are graphs for explaining the relationship between the spectrum of Raman amplification pumping light and the gain spectrum of Raman amplification. For example, when signal light has a 1.55-μm wavelength band, the wavelength of Raman amplification pumping light is almost 1.45 μm. The gain spectrum of Raman amplification in the Raman amplification optical fiber 11 is determined depending on the power and spectrum of Raman amplification pumping light. Assume that when Raman amplification pumping light is monochromatic light having a wavelength $\lambda_1$ and power $P_1$, a gain spectrum shown in FIG. 5A is obtained, and when Raman amplification pumping light is monochromatic light having a wavelength $\lambda_2$ and power $P_2$, a gain spectrum shown in FIG. 5B is obtained.

Figure 5C:
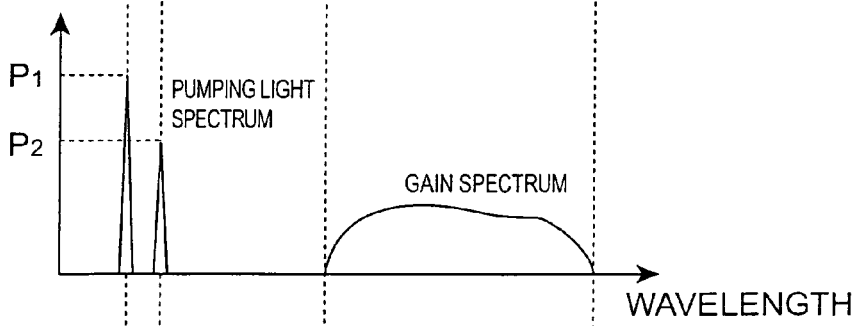
Figure 5D:
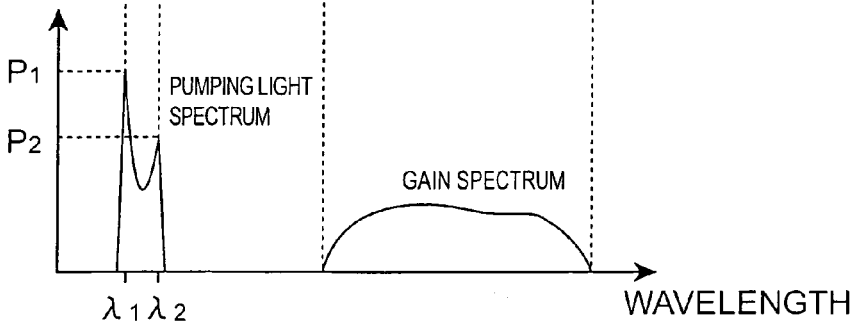

When the Raman amplification pumping light having the wavelength $\lambda_1$ and power $P_1$ and the Raman amplification pumping light having the wavelength $\lambda_2$ and power $P_2$ are multiplexed, as shown in FIG. 5C, and supplied to the Raman amplification optical fiber 11, a gain spectrum corresponding to the sum of the gain spectrum shown in FIG. 5A and that shown in FIG. 5B is obtained. Even when Raman amplification pumping light which has a pumping spectrum almost the same as the pumping light spectrum shown in FIG. 5C, as shown in FIG. 5D, is supplied to the Raman amplification optical fiber 11, the obtained gain spectrum almost equals the sum of the gain spectrum shown in FIG. 5A and that shown in FIG. 5B. The Raman amplification pumping light having the pumping light spectrum shown in FIG. 5C or 5D can be output from the pumping light source described above with reference to FIGS. 3 and 4A to 4C.

The operation of the Raman amplifier 1 according to the first embodiment will be described next. Raman amplification pumping light output from the pumping light source unit 13 is supplied to the Raman amplification optical fiber 11 through the optical circulator $12_2$. That is, the pumping light source unit 13 and optical circulator $12_2$ operate as a Raman amplification pumping light supply means for supplying Raman amplification pumping light to the Raman amplification optical fiber 11.

The Raman amplification pumping light remaining after propagation through the Raman amplification optical fiber 11 enters the bandpass filter 15 through the optical circulator $12_1$. A light component having a specific wavelength of the incident light passes through the bandpass filter 15, and the power of the light component is detected by the light-receiving element 16. That is, the optical circulator $12_1$, bandpass filter 15, and light-receiving element 16 operate as a residual pumping light power detection means for detecting the power of the Raman amplification pumping light remaining after propagation through the Raman amplification optical fiber 11.

On the other hand, signal light that has reached the Raman amplifier 1 enters the Raman amplification optical fiber 11 through the optical isolator 17 and optical circulator $12_1$. The signal light propagates through the Raman amplification optical fiber 11 while being Raman-amplified during propagation and is output to the output side through the optical circulator $12_2$. The signal light propagating through the Raman amplification optical fiber 11 preferably has a power enough to almost suppress any nonlinear optical phenomenon at the respective points of the Raman amplification optical fiber 11.

The control section 14 controls the power and also spectral shape of Raman amplification pumping light output from each of the N pumping light sources included in the pumping light source unit 13. The power and spectral shape of the Raman amplification pumping light are controlled such that the gain spectrum of Raman amplification of signal light in the Raman amplification optical fiber 11 is kept flat and constant in the signal light wavelength band. In this embodiment, the Raman amplification pumping light components output from the N pumping light sources included in the pumping light source unit 13 are controlled by the control section 14 on the basis of the power of the remaining Raman amplification pumping light detected by the light-receiving element 16.

As described above, in the Raman amplifier 1 according to this embodiment, the spectrum of light output from each of the N pumping light sources included in the pumping light source unit 13 is non-unimodal or changeable. The power or spectrum of Raman amplification pumping light is controlled by the control section 14 on the basis of the power of remaining Raman amplification pumping light detected by the light-receiving element 16 whereby the gain spectrum of Raman amplification of signal light in the Raman amplification optical fiber 11 is kept flat and constant in the signal light wavelength band.

In the Raman amplifier 1 according to this embodiment, since the pumping light source having the output spectrum as described above is employed, the number of pumping light sources can be made smaller than that in the prior art described in reference 1. Hence, the gain spectrum flattening can easily be controlled, and the cost can be reduced. In the Raman amplifier 1 according to this embodiment, since the gain spectrum can be flattened without using any gain equalizer, the gain spectrum flattening can easily be controlled, and the pumping efficiency is high, as compared to the prior art described in reference 2.

In this embodiment, all powers of the Raman amplification pumping light components may be detected by the light-receiving element 16 without arranging the bandpass filter 15. Optical couplers may be used in place of the optical circulators $12_1$ and $12_2$. Instead of back pumping, forward pumping or two-way pumping may be employed.

(Second Embodiment)

Figure 6:
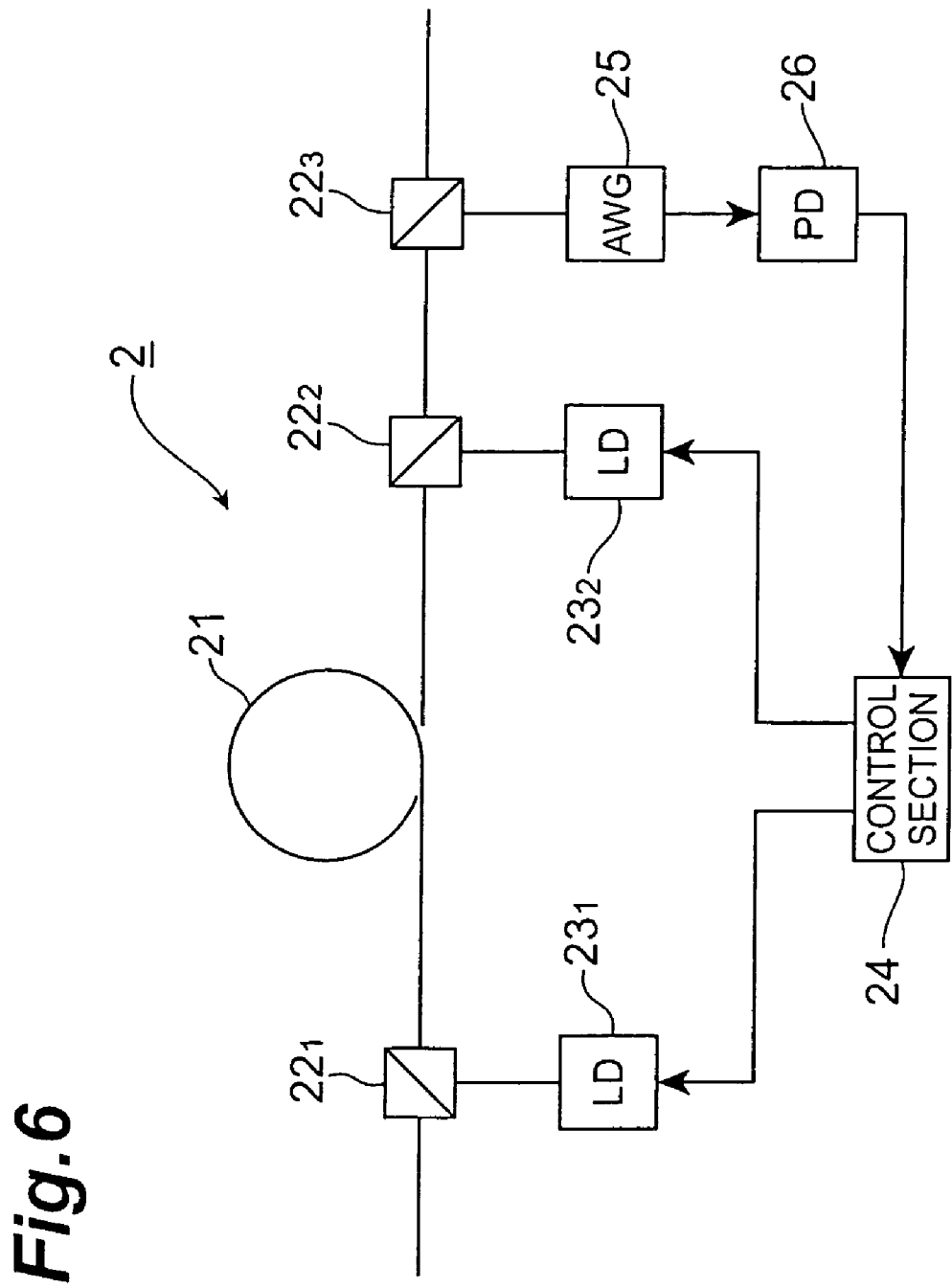
FIG. 6 is a view showing the arrangement of a Raman amplifier according to the second embodiment.

A Raman amplifier according to the second embodiment of the present invention will be described next. FIG. 6 is a view showing the arrangement of a Raman amplifier 2 according to the second embodiment. This Raman amplifier 2 comprises a Raman amplification optical fiber 21, optical couplers $22_1$ to $22_3$, pumping light source units $23_1$ and $23_2$, control section 24, AWG (Arrayed-Waveguide Grating) 25, and light-receiving element 26.

The Raman amplification optical fiber 21 receives Raman amplification pumping light components from the optical couplers $22_1$ and $22_2$ and transmits signal light from the optical coupler $22_1$ to the optical coupler $22_2$ while Raman-amplifying the signal light. The optical coupler $22_1$ outputs signal light that has reached the Raman amplifier 2 to the Raman amplification optical fiber 21 and also outputs to the Raman amplification optical fiber 21 Raman amplification pumping light supplied from the pumping light source unit $23_1$. The optical coupler $22_2$ outputs signal light from the Raman amplification optical fiber 21 to the optical coupler $22_3$ and outputs to the Raman amplification optical fiber 21 Raman amplification pumping light supplied from the pumping light source unit $23_2$.

The optical coupler $22_3$ outputs most components of the signal light sent from the optical coupler $22_2$ to the output side and also branches and outputs some light components to the AWG 25. The AWG 25 receives the signal light output from the optical coupler $22_3$, demultiplexes the signal light, and outputs the demultiplexed signal light components with different wavelengths. The light-receiving element 26 receives the signal light components with different wavelengths output from the AWG 25 and outputs an electrical signal having a value corresponding to the light-receiving amount.

Each of the pumping light source units $23_1$ and $23_2$ has N (N≧1) pumping light sources and outputs light components output from the N pumping light sources, as Raman amplification pumping light. The spectrum of light output from each pumping light source is non-unimodal or changeable. The control section 24 controls the power or spectrum of Raman amplification pumping light output from each of the pumping light source units $23_1$ and $23_2$ on the basis of the electrical signal output from the light-receiving element 26. Each of the pumping light source units $23_1$ and $23_2$ of this embodiment is the same as that described with reference to FIGS. 2, 3, and 4A to 4C.

The operation of the Raman amplifier 2 according to the second embodiment will be described next. Raman amplification pumping light output from the pumping light source unit $23_1$ is supplied to the Raman amplification optical fiber 21 through the optical coupler $22_1$. Raman amplification pumping light output from the pumping light source unit $23_2$ is supplied to the Raman amplification optical fiber 21 through the optical coupler $22_2$. That is, the pumping light source units $23_1$ and $23_2$ and optical coupler $22_1$ and $22_2$ operate as a Raman amplification pumping light supply means for supplying Raman amplification pumping light to the Raman amplification optical fiber 21.

Signal light that has reached the Raman amplifier 2 enters the Raman amplification optical fiber 21 through the optical coupler $22_1$. The signal light propagates through the Raman amplification optical fiber 21 while being Raman-amplified during propagation and is output to the output side through the optical couplers $22_2$ and $22_3$. The signal light propagating through the Raman amplification optical fiber 21 preferably has a power enough to almost suppress any nonlinear optical phenomenon at the respective points of the Raman amplification optical fiber 21.

Some light components of the signal light after propagation through the Raman amplification optical fiber 21 enter the AWG 25 through the optical coupler $22_3$ and are demultiplexed by the AWG 25. The level of each of the signal light components having different wavelengths is detected by the light-receiving element 26. That is, the optical coupler $22_3$, AWG 25, and light-receiving element 26 operate as a signal light level detection means for detecting the level of each of signal light components having different wavelengths after propagation through the Raman amplification optical fiber 21.

The control section 24 controls the power and also spectral shape of Raman amplification pumping light output from each of the N pumping light sources included in each of the pumping light source units $23_1$ and $23_2$ on the basis of the level of each of the signal light components with different wavelengths, which is detected by the light-receiving element 26. The power and spectral shape of the Raman amplification pumping light are controlled such that the gain spectrum of Raman amplification of signal light in the Raman amplification optical fiber 21 is kept flat and constant in the signal light wavelength band.

As described above, in the Raman amplifier 2 according to this embodiment, the spectrum of light output from each of the N pumping light sources included in each of the pumping light source units $23_1$ and $23_2$ is non-unimodal or changeable. The power or spectrum of Raman amplification pumping light is controlled by the control section 24 on the basis of the level of each of signal light components with different wavelengths, which is detected by the light-receiving element 26, whereby the gain spectrum of Raman amplification of signal light in the Raman amplification optical fiber 21 is kept flat and constant in the signal light wavelength band.

In the Raman amplifier 2 according to this embodiment, since the pumping light source having the output spectrum as described above is employed, the number of pumping light sources can be made smaller than that in the prior art described in reference 1. Hence, the gain spectrum flattening can easily be controlled, and the cost can be reduced. In the Raman amplifier 2 according to this embodiment, since the gain spectrum can be flattened without using any gain equalizer, the gain spectrum flattening can easily be controlled, and the pumping efficiency is high, as compared to the prior art described in reference 2.

In this embodiment, the optical coupler $22_3$, AWG 25, and light-receiving element 26 also operate as a signal light wavelength detection means for detecting the wavelength of signal light input to the Raman amplifier 2. On the basis of the detected signal light wavelength, the control section 24 controls whether each of the N pumping light sources included in each of the pumping light source unit $23_1$ and $23_2$ is to output Raman amplification pumping light. With this arrangement, the number of pumping light sources to be used can be decreased depending on the signal light wavelength.

In this embodiment, a bandpass filter may be used in place of the AWG 25. An optical circulator may be used in place of the optical coupler $22_2$. Instead of two-way pumping, forward pumping or back pumping may be employed. The pumping light source units $23_1$ and $23_2$ need not always include pumping light sources in equal number.

(Third Embodiment)

Figure 7:
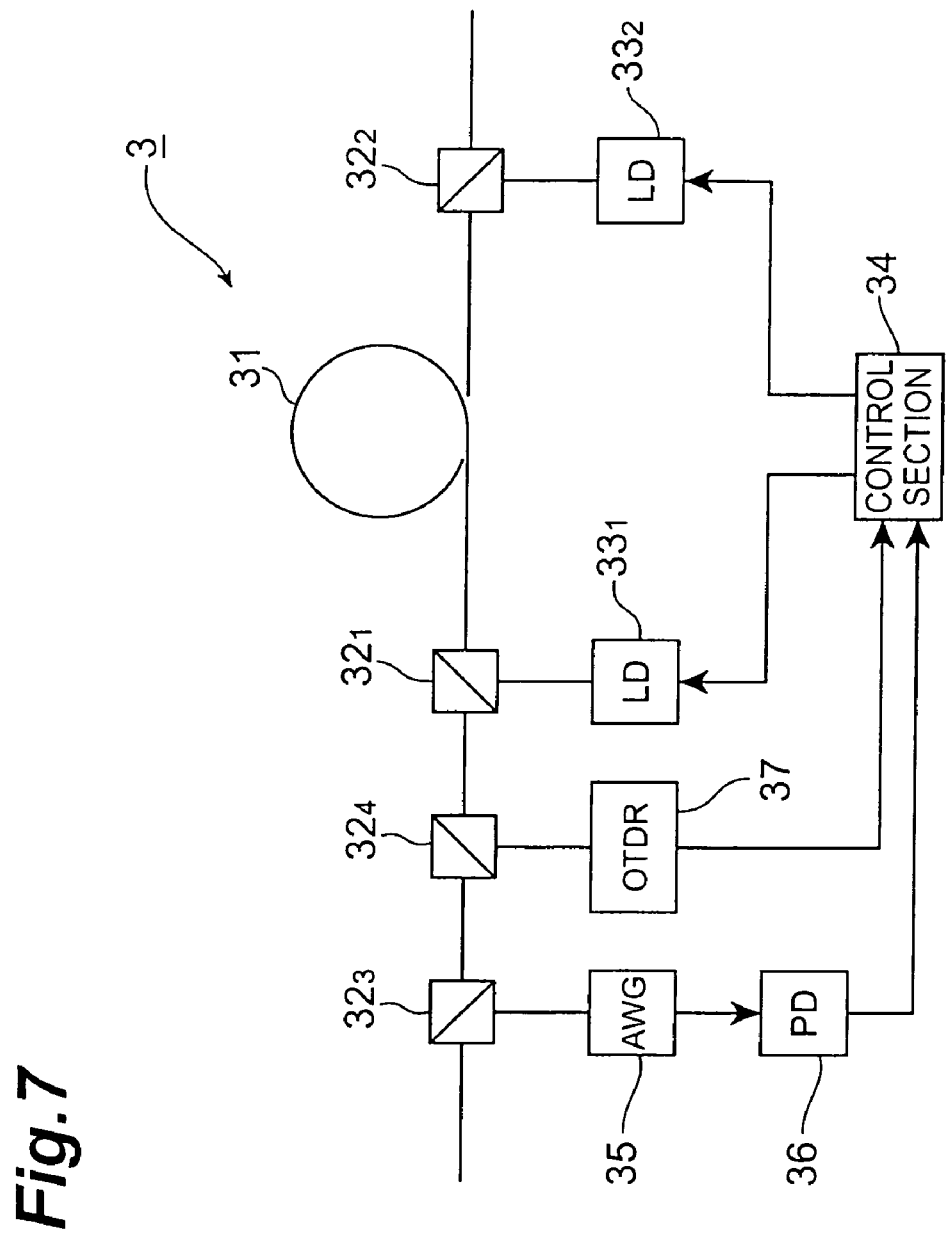
FIG. 7 is a view showing the arrangement of a Raman amplifier according to the third embodiment.

A Raman amplifier according to the third embodiment of the present invention will be described next. FIG. 7 is a view showing the arrangement of a Raman amplifier 3 according to the third embodiment. This Raman amplifier 3 comprises a Raman amplification optical fiber 31, optical couplers $32_1$ to $32_4$, pumping light source units $33_1$ and $33_2$, control section 34, AWG 35, light-receiving element 36, and OTDR section 37.

The Raman amplification optical fiber 31 receives Raman amplification pumping light components from the optical couplers $32_1$ and $32_2$ and transmits signal light from the optical coupler $32_1$ to the optical coupler $32_2$ while Raman-amplifying the signal light. The optical coupler $32_1$ outputs signal light sent from the optical coupler $32_4$ to the Raman amplification optical fiber 31 and also outputs to the Raman amplification optical fiber 31 Raman amplification pumping light supplied from the pumping light source unit $33_1$. The optical coupler $32_2$ outputs signal light from the Raman amplification optical fiber 31 to the output side and outputs to the Raman amplification optical fiber 31 Raman amplification pumping light supplied from the pumping light source unit $33_2$.

The optical coupler $32_3$ outputs most components of the signal light that has reached the Raman amplifier 3 to the optical coupler $32_4$ and also branches and outputs some light components to the AWG 35. The AWG 35 receives the signal light output from the optical coupler $32_3$, demultiplexes the signal light, and outputs the demultiplexed signal light components with different wavelengths. The light-receiving element 36 receives the signal light components with different wavelengths output from the AWG 35 and outputs an electrical signal having a value corresponding to the light-receiving amount.

The OTDR section 37 supplies pulsed inspection light to the Raman amplification optical fiber 31 through the optical coupler $32_4$ and receives, through the optical coupler $32_4$, backscattering light generated when the inspection light propagates through the Raman amplification optical fiber 31. The OTDR section 37 detects the longitudinal loss distribution of the Raman amplification optical fiber 31 on the basis of a time change in received backscattering light. The wavelength of the inspection light is preferably different from that of the signal light and falls between the signal light wavelengths.

Each of the pumping light source units $33_1$ and $33_2$ has N ($N \geq 1$) pumping light sources and outputs light components output from the N pumping light sources, as Raman amplification pumping light. The spectrum of light output from each pumping light source is non-unimodal or changeable. The control section 34 controls the power or spectrum of Raman amplification pumping light output from each of the pumping light source units $33_1$ and $33_2$ on the basis of the longitudinal loss distribution of the Raman amplification optical fiber 31, which is detected by the OTDR section 37, and the electrical signal output from the light-receiving element 36. Each of the pumping light source units $33_1$ and $33_2$ of this embodiment is the same as that described with reference to FIGS. 2, 3, and 4A to 4C.

The operation of the Raman amplifier 3 according to the third embodiment will be described next. Raman amplification pumping light output from the pumping light source unit $33_1$ is supplied to the Raman amplification optical fiber 31 through the optical coupler $32_1$. Raman amplification pumping light output from the pumping light source unit $33_2$ is supplied to the Raman amplification optical fiber 31 through the optical coupler $32_2$. That is, the pumping light source units $33_1$ and $33_2$ and optical coupler $32_1$ and $32_2$ operate as a Raman amplification pumping light supply means for supplying Raman amplification pumping light to the Raman amplification optical fiber 31.

Signal light that has reached the Raman amplifier 3 enters the Raman amplification optical fiber 31 through the optical couplers $32_3$, $32_4$, and $32_1$. The signal light propagates through the Raman amplification optical fiber 31 while being Raman-amplified during propagation and is output to the output side through the optical coupler $32_2$. The signal light propagating through the Raman amplification optical fiber 31 preferably has a power enough to almost suppress any nonlinear optical phenomenon at the respective points of the Raman amplification optical fiber 31.

Some light components of the signal light that has reached the Raman amplifier 3 enter the AWG 35 through the optical coupler $32_3$ and are demultiplexed by the AWG 35. The level of each of the signal light components having different wavelengths is detected by the light-receiving element 36. That is, the optical coupler $32_3$, AWG 35, and light-receiving element 36 operate as a signal light wavelength detection means for detecting the wavelength of each of signal light components input to the Raman amplifier 3. The OTDR section 37 detects the longitudinal loss distribution of the Raman amplification optical fiber 31.

The control section 34 controls the power and also spectral shape of Raman amplification pumping light output from each of the N pumping light sources included in each of the pumping light source units $33_1$ and $33_2$ on the basis of the longitudinal loss distribution of the Raman amplification optical fiber 31, which is detected by the OTDR section 37. The power and spectral shape of the Raman amplification pumping light are controlled such that the gain spectrum of Raman amplification of signal light in the Raman amplification optical fiber 31 is kept flat and constant in the signal light wavelength band.

As described above, in the Raman amplifier 3 according to this embodiment, the spectrum of light output from each of the N pumping light sources included in each of the pumping light source units $33_1$ and $33_2$ is non-unimodal or changeable. The power or spectrum of Raman amplification pumping light is controlled by the control section 34 on the basis of the longitudinal loss distribution of the Raman amplification optical fiber 31, which is detected by the OTDR section 37, whereby the gain spectrum of Raman amplification of signal light in the Raman amplification optical fiber 31 is kept flat and constant in the signal light wavelength band.

In the Raman amplifier 3 according to this embodiment, since the pumping light source having the output spectrum as described above is employed, the number of pumping light sources can be made smaller than that in the prior art described in reference 1. Hence, the gain spectrum flattening can easily be controlled, and the cost can be reduced. In the Raman amplifier 3 according to this embodiment, since the gain spectrum can be flattened without using any gain equalizer, the gain spectrum flattening can easily be controlled, and the pumping efficiency is high, as compared to the prior art described in reference 2.

In this embodiment, on the basis of the signal light wavelength detected by the optical coupler $32_3$, AWG 35, and light-receiving element 36, the control section 34 controls whether each of the N pumping light sources included in each of the pumping light source unit $33_1$ and $33_2$ is to output Raman amplification pumping light. With this arrangement, the number of pumping light sources to be used can be decreased depending on the signal light wavelength.

In this embodiment, an optical circulator may be used in place of the optical coupler $32_2$. Instead of two-way pumping, forward pumping or back pumping may be employed. The pumping light source units $33_1$ and $33_2$ need not always include pumping light sources in equal number.

(Fourth Embodiment)

Figure 8:
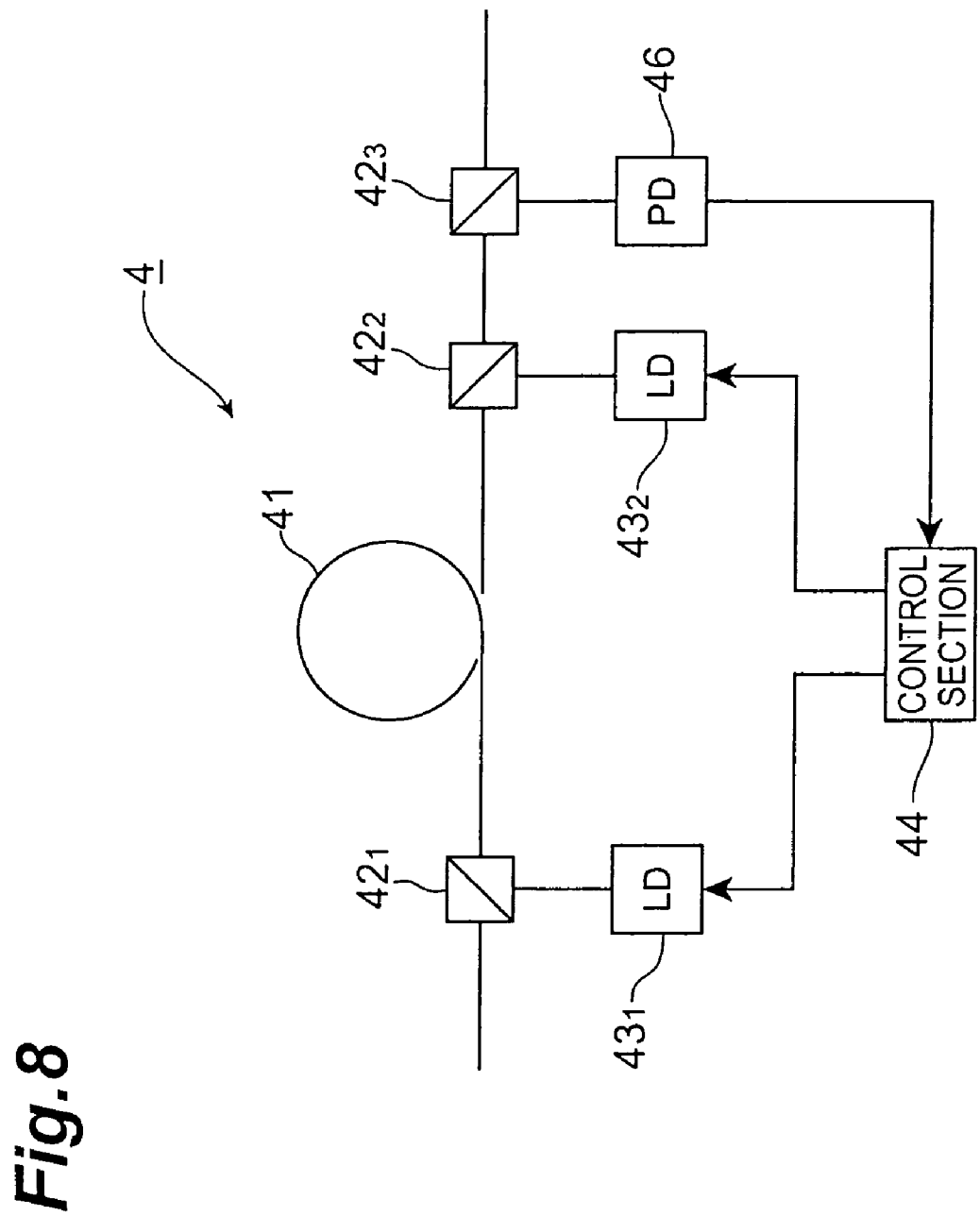
FIG. 8 is a view showing the arrangement of a Raman amplifier according to the fourth embodiment.

A Raman amplifier according to the fourth embodiment of the present invention will be described next. FIG. 8 is a view showing the arrangement of a Raman amplifier 4 according to the fourth embodiment. This Raman amplifier 4 comprises a Raman amplification optical fiber 41, optical couplers $42_1$ to $42_3$, pumping light source units $43_1$ and $43_2$, control section 44, and light-receiving element 46. The Raman amplifier 4 is used in an optical communication system which transmits a pilot light as well as signal light. The wavelength of the pilot light is preferably different from that of the signal light and present between the signal light wavelengths.

The Raman amplification optical fiber 41 receives Raman amplification pumping light components from the optical couplers $42_1$ and $42_2$ and transmits signal light and pilot light from the optical coupler $42_1$ to the optical coupler $42_2$ while Raman-amplifying the signal light and pilot light. The optical coupler $42_1$ outputs signal light that has reached the Raman amplifier 4 to the Raman amplification optical fiber 41 and also outputs to the Raman amplification optical fiber 41 Raman amplification pumping light supplied from the pumping light source unit $43_1$. The optical coupler $42_2$ outputs signal light from the Raman amplification optical fiber 41 to the optical coupler $42_3$ and outputs to the Raman amplification optical fiber 41 Raman amplification pumping light supplied from the pumping light source unit $43_2$.

The optical coupler $42_3$ outputs the signal light and most components of the pilot light, which are sent from the optical coupler $42_2$, to the output side and also branches and outputs some light components of the pilot light to the light-receiving element 46. The light-receiving element 46 receives the pilot light sent from the optical coupler $42_3$ and outputs an electrical signal having a value corresponding to the light-receiving amount.

Each of the pumping light source units $43_1$ and $43_2$ has N (N≧1) pumping light sources and outputs light components output from the N pumping light sources, as Raman amplification pumping light. The spectrum of light output from each pumping light source is non-unimodal or changeable. The control section 44 controls the power or spectrum of Raman amplification pumping light output from each of the pumping light source units $43_1$ and $43_2$ on the basis of the electrical signal output from the light-receiving element 46. Each of the pumping light source units $43_1$ and $43_2$ of this embodiment is the same as that described with reference to FIGS. 2, 3, and 4A to 4C.

The operation of the Raman amplifier 4 according to the fourth embodiment will be described next. Raman amplification pumping light output from the pumping light source unit $43_1$ is supplied to the Raman amplification optical fiber 41 through the optical coupler $42_1$. Raman amplification pumping light output from the pumping light source unit $43_2$ is supplied to the Raman amplification optical fiber 41 through the optical coupler $42_2$. That is, the pumping light source units $43_1$ and $43_2$ and optical coupler $42_1$ and $42_2$ operate as a Raman amplification pumping light supply means for supplying Raman amplification pumping light to the Raman amplification optical fiber 41.

Signal light and pilot light that have reached the Raman amplifier 4 enter the Raman amplification optical fiber 41 through the optical coupler $42_1$. The signal light and pilot light propagate through the Raman amplification optical fiber 41 while being Raman-amplified during propagation and are output to the output side through the optical couplers $42_2$ and $42_3$. The signal light and pilot light propagating through the Raman amplification optical fiber 41 preferably have a power enough to almost suppress any nonlinear optical phenomenon at the respective points of the Raman amplification optical fiber 41.

Some light components of the pilot light after propagation through the Raman amplification optical fiber 41 enter the light-receiving element 46 through the optical coupler $42_3$. The level of the pilot light is detected by the light-receiving element 46. That is, the optical coupler $42_3$ and light-receiving element 46 operate as a pilot light level detection means for detecting the level of pilot light after propagation through the Raman amplification optical fiber 41.

The control section 44 controls the power and also spectral shape of Raman amplification pumping light output from each of the N pumping light sources included in each of the pumping light source units $43_1$ and $43_2$ on the basis of the pilot light level detected by the light-receiving element 46. The power and spectral shape of the Raman amplification pumping light are controlled such that the gain spectrum of Raman amplification of signal light in the Raman amplification optical fiber 41 is kept flat and constant in the signal light wavelength band.

As described above, in the Raman amplifier 4 according to this embodiment, the spectrum of light output from each of the N pumping light sources included in each of the pumping light source units $43_1$ and $43_2$ is non-unimodal or changeable. The power or spectrum of Raman amplification pumping light is controlled by the control section 44 on the basis of the pilot light level detected by the light-receiving element 46 whereby the gain spectrum of Raman amplification of signal light in the Raman amplification optical fiber 41 is kept flat and constant in the signal light wavelength band.

In the Raman amplifier 4 according to this embodiment, since the pumping light source having the output spectrum as described above is employed, the number of pumping light sources can be made smaller than that in the prior art described in reference 1. Hence, the gain spectrum flattening can easily be controlled, and the cost can be reduced. In the Raman amplifier 4 according to this embodiment, since the gain spectrum can be flattened without using any gain equalizer, the gain spectrum flattening can easily be controlled, and the pumping efficiency is high, as compared to the prior art described in reference 2.

In this embodiment, an optical circulator may be used in place of the optical coupler $42_2$. Instead of two-way pumping, forward pumping or back pumping may be employed. The pumping light source units $43_1$ and $43_2$ need not always include pumping light sources in equal number.

(Fifth Embodiment)

Figure 9:
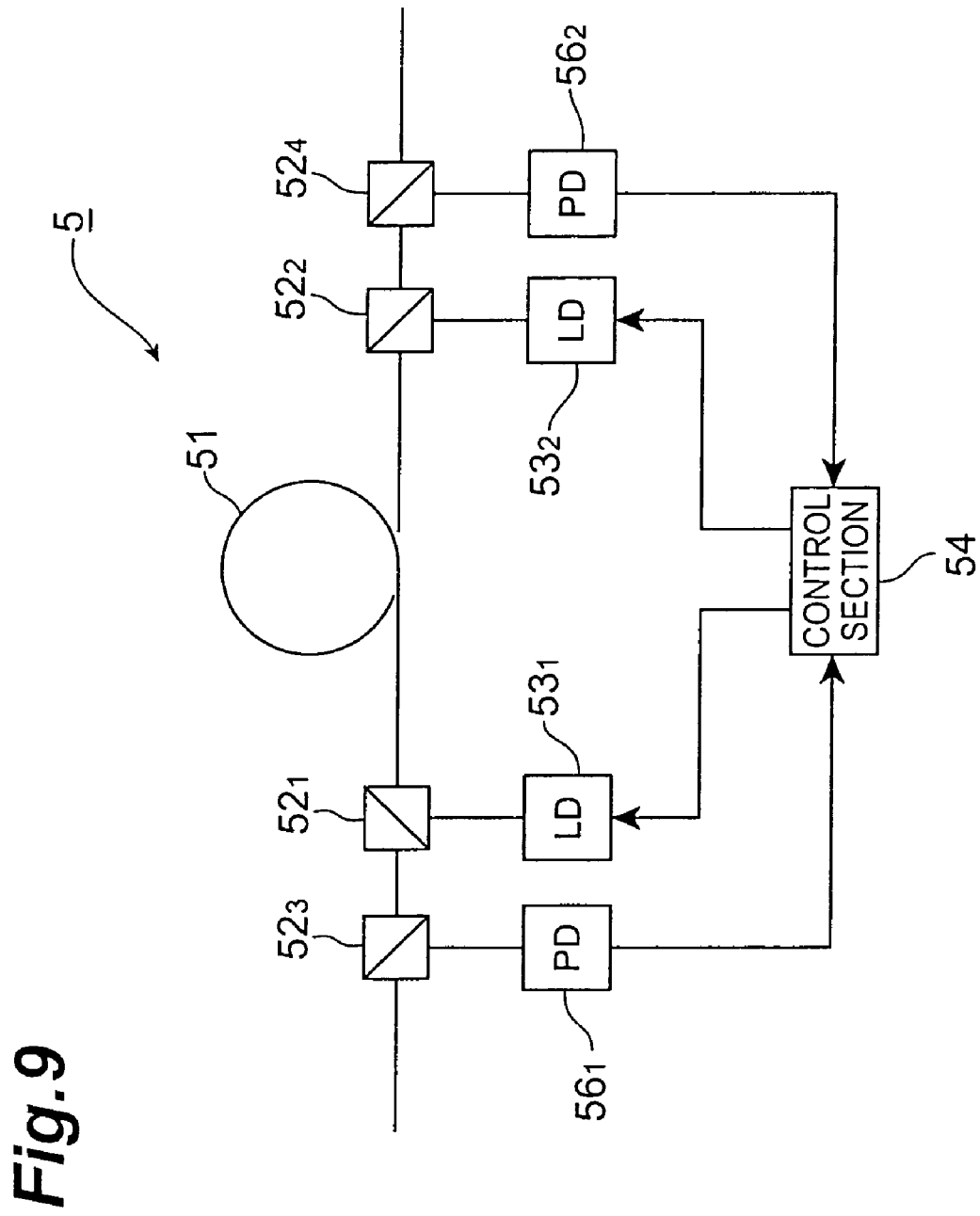
FIG. 9 is a view showing the arrangement of a Raman amplifier according to the fifth embodiment.

A Raman amplifier according to the fifth embodiment of the present invention will be described next. FIG. 9 is a view showing the arrangement of a Raman amplifier 5 according to the fifth embodiment. This Raman amplifier 5 comprises a Raman amplification optical fiber 51, optical couplers $52_1$ to $52_4$, pumping light source units $53_1$ and $53_2$, control section 54, and light-receiving elements $56_1$ and $56_2$.

The Raman amplification optical fiber 51 receives Raman amplification pumping light components from the optical couplers $52_1$ and $52_2$ and transmits signal light from the optical coupler $52_1$ to the optical coupler $52_2$ while Raman-amplifying the signal light. The optical coupler $52_1$ outputs signal light sent from the optical coupler $52_3$ to the Raman amplification optical fiber 51 and also outputs to the Raman amplification optical fiber 51 Raman amplification pumping light supplied from the pumping light source unit $53_1$. The optical coupler $52_2$ outputs signal light from the Raman amplification optical fiber 51 to the optical coupler $52_4$ and outputs to the Raman amplification optical fiber 51 Raman amplification pumping light supplied from the pumping light source unit $53_2$.

The optical coupler $52_3$ outputs most components of the signal light that has reached the Raman amplifier 5 to the optical coupler $52_1$ and also outputs some components of the signal light to the light-receiving element $56_1$. The light-receiving element $56_1$ receives the signal light sent from the optical coupler $52_3$ and outputs an electrical signal having a value corresponding to the light-receiving amount. The optical coupler $52_4$ outputs most components of the signal light from the optical coupler $52_2$ to the output side and also outputs some components of the signal light to the light-receiving element $56_2$. The light-receiving element $56_2$ receives the signal light sent from the optical coupler $52_4$ and outputs an electrical signal having a value corresponding to the light-receiving amount.

Each of the pumping light source units $53_1$ and $53_2$ has N (N≧1) pumping light sources and outputs light components output from the N pumping light sources, as Raman amplification pumping light. The spectrum of light output from each pumping light source is non-unimodal or changeable. The control section 54 controls the power or spectrum of Raman amplification pumping light output from each of the pumping light source units $53_1$ and $53_2$ on the basis of the electrical signals output from the light-receiving elements $56_1$ and $56_2$. Each of the pumping light source units $53_1$ and $53_2$ of this embodiment is the same as that described with reference to FIGS. 2, 3, and 4A to 4C.

The operation of the Raman amplifier 5 according to the fifth embodiment will be described next. Raman amplification pumping light output from the pumping light source unit $53_1$ is supplied to the Raman amplification optical fiber 51 through the optical coupler $52_1$. Raman amplification pumping light output from the pumping light source unit $53_2$ is supplied to the Raman amplification optical fiber 51 through the optical coupler $52_2$. That is, the pumping light source units $53_1$ and $53_2$ and optical coupler $52_1$ and $52_2$ operate as a Raman amplification pumping light supply means for supplying Raman amplification pumping light to the Raman amplification optical fiber 51.

Signal light that has reached the Raman amplifier 5 enters the Raman amplification optical fiber 51 through the optical couplers $52_3$ and $52_1$. The signal light propagates through the Raman amplification optical fiber 51 while being Raman-amplified during propagation and is output to the output side through the optical couplers $52_2$ and $52_4$. The signal light propagating through the Raman amplification optical fiber 51 preferably has a power enough to almost suppress any nonlinear optical phenomenon at the respective points of the Raman amplification optical fiber 51.

Some light components of the signal light that has reached the Raman amplifier 5 enter the light-receiving element $56_1$ through the optical coupler $52_3$. The input signal light power is detected by the light-receiving element $56_1$. That is, the optical coupler $52_3$ and light-receiving element $56_1$ operate as an input signal light power detection means for detecting the power of signal light input to the Raman amplification optical fiber 51. Some light components of the signal light output from the Raman amplifier 5 enter the light-receiving element $56_2$ through the optical coupler $52_4$. The output signal light power is detected by the light-receiving element $56_2$. That is, the optical coupler $52_4$ and light-receiving element $56_2$ operate as an output signal light power detection means for detecting the power of signal light output from the Raman amplification optical fiber 51.

The control section 54 controls the power and also spectral shape of Raman amplification pumping light output from each of the N pumping light sources included in each of the pumping light source units $53_1$ and $53_2$ on the basis of the input signal light power detected by the light-receiving element $56_1$ and the output signal light power detected by the light-receiving element $56_2$. The power and spectral shape of the Raman amplification pumping light are controlled such that the gain spectrum of Raman amplification of signal light in the Raman amplification optical fiber 51 is kept flat and constant in the signal light wavelength band.

As described above, in the Raman amplifier 5 according to this embodiment, the spectrum of light output from each of the N pumping light sources included in each of the pumping light source units $53_1$ and $53_2$ is non-unimodal or changeable. The power or spectrum of Raman amplification pumping light is controlled by the control section 54 on the basis of the input signal light power and output signal light power whereby the gain spectrum of Raman amplification of signal light in the Raman amplification optical fiber 51 is kept flat and constant in the signal light wavelength band.

In the Raman amplifier 5 according to this embodiment, since the pumping light source having the output spectrum as described above is employed, the number of pumping light sources can be made smaller than that in the prior art described in reference 1. Hence, the gain spectrum flattening can easily be controlled, and the cost can be reduced. In the Raman amplifier 5 according to this embodiment, since the gain spectrum can be flattened without using any gain equalizer, the gain spectrum flattening can easily be controlled, and the pumping efficiency is high, as compared to the prior art described in reference 2.

In this embodiment, an optical circulator may be used in place of the optical coupler $52_2$. Instead of two-way pumping, forward pumping or back pumping may be employed. The pumping light source units $53_1$ and $53_2$ need not always include pumping light sources in equal number.

(Sixth Embodiment)

Figure 10:
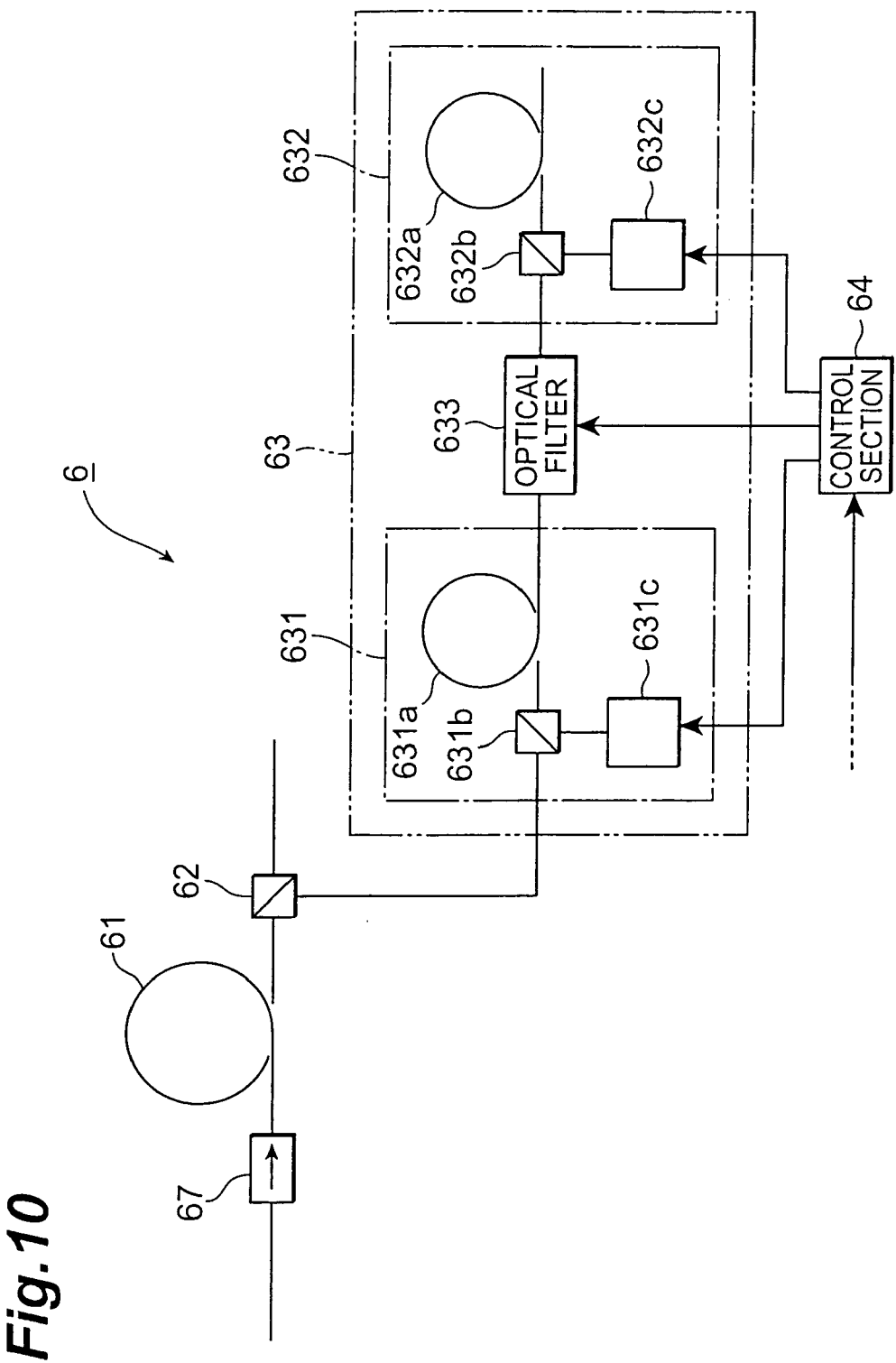
FIG. 10 is a view showing the arrangement of a Raman amplifier according to the sixth embodiment.

A Raman amplifier according to the sixth embodiment of the present invention will be described next. FIG. 10 is a view showing the arrangement of a Raman amplifier 6 according to the sixth embodiment. This Raman amplifier 6 comprises a Raman amplification optical fiber 61, optical coupler 62, pumping light source unit 63, control section 64, and optical isolator 67.

The Raman amplification optical fiber 61 receives Raman amplification pumping light from the optical coupler 62 and transmits signal light from the optical isolator 67 to the optical coupler 62 while Raman-amplifying the signal light. The optical isolator 67 passes light only in the forward direction and not in the reverse direction. The optical coupler 62 outputs to the output side signal light sent from the Raman amplification optical fiber 61 and outputs to the Raman amplification optical fiber 61 Raman amplification pumping light supplied from the pumping light source unit 63.

The pumping light source unit 63 outputs Raman amplification pumping light to be supplied to the Raman amplification optical fiber 61 and has Er-doped optical fiber amplifiers (EDFAs: Erbium-Doped Fiber Amplifiers) 631 and 632 and an optical filter 633. The EDFA 631 includes an Er-doped optical fiber (EDF: Erbium-Doped Fiber) 631a, optical coupler 631b, and pumping light source 631c. The EDFA 632 includes an EDF 632a, optical coupler 632b, and pumping light source 632c.

Each of the EDFs 631a and 632a is formed from an optical fiber for which Er as a rare earth element is doped in an optical waveguide region. Upon receiving pumping light having a wavelength of 1.48 μm or 0.98 μm, Er is excited to generate spontaneous emission light in the 1.55-μm wavelength band. The spectrum of the spontaneous emission light depends on the concentrations of Er and other elements (e.g., Al) doped in the EDFs 631a and 632a. Each of the pumping light sources 631c and 632c outputs pumping light having a wavelength of 1.48 μm or 0.98 μm that can excite Er. The optical couplers 631b and 632b respectively supply to the EDFs 631a and 632a pumping light components output from the pumping light sources 631c and 632c and pass to the optical coupler 62 spontaneous emission light components generated by the EDFs 631a and 632a, as Raman amplification pumping light. The optical filter 633 is inserted between the EDFA 631 and the EDFA 632 to adjust the spectrum of spontaneous emission light to be supplied to the Raman amplification optical fiber 61 as Raman amplification pumping light.

The control section 64 controls the power of pumping light output from each of the pumping light sources 631c and 632c, thereby controlling the power or spectrum of Raman amplification pumping light output from the pumping light source unit 63. The control section 64 may control the power or spectrum of Raman amplification pumping light by controlling the loss spectrum of the optical filter 633.

For this control, the power or spectrum of Raman amplification pumping light is preferably controlled, e.g., on the basis of the power of Raman amplification pumping light remaining after propagation through the Raman amplification optical fiber 61, as in the first embodiment, on the basis of the wavelength of signal light propagating through the Raman amplification optical fiber 61, as in the second embodiment, on the basis of the longitudinal loss distribution of the Raman amplification optical fiber 61, as in the third embodiment, on the basis of the level of pilot light, as in the fourth embodiment, or on the basis of the input signal light power and output signal light power, as in the fifth embodiment.

The operation of the Raman amplifier 6 according to the sixth embodiment will be described next. In the EDFA 631, pumping light output from the pumping light source 631c is supplied to the EDF 631a through the optical coupler 631b. In the EDFA 632, pumping light output from the pumping light source 632c is supplied to the EDF 632a through the optical coupler 632b.

When the pumping light is supplied to the EDF 632a in the EDFA 632 at the former stage, the EDF 632a generates spontaneous emission light. The spontaneous emission light generated by the EDF 632a is input to the optical filter 633 through the optical coupler 632b, and after spectrum adjustment by the optical filter 633, input to the EDF 631a in the EDFA 631 at the latter stage.

When pumping light is supplied to the EDF 631a in the EDFA 631 at the latter stage, and the spontaneous emission light that has passed through the optical filter 633 is input to the EDF 631a, the spontaneous emission light that has passed through the optical filter 633 is optically amplified in the EDF 631a, and simultaneously, new spontaneous emission light is generated in the EDF 631a. The spontaneous emission light amplified or newly generated by the EDF 631a is supplied to the Raman amplification optical fiber 61 as Raman amplification pumping light through the optical couplers 631b and 62.

That is, the pumping light source unit 63 and optical coupler 62 operate as a Raman amplification pumping light supply means for supplying Raman amplification pumping light (1.55-μm wavelength band) to the Raman amplification optical fiber 61. The Raman amplification pumping light supplied from the pumping light source unit 63 to the Raman amplification optical fiber 61 is spontaneous emission light generated by the EDFs 631a and 632a and therefore has a spectrum in a wide band.

On the other hand, signal light (1.65-μm wavelength band) that has reached the Raman amplifier 6 enters the Raman amplification optical fiber 61 through the optical isolator 67. The signal light propagates through the Raman amplification optical fiber 61 while being Raman-amplified during propagation and is output to the output side through the optical coupler 62. The signal light propagating through the Raman amplification optical fiber 61 preferably has a power enough to almost suppress any nonlinear optical phenomenon at the respective points of the Raman amplification optical fiber 61.

The control section 64 controls the power of pumping light output from each of the pumping light sources 631c and 632c included in the pumping light source unit 63 and also the loss spectrum of the optical filter 633, thereby controlling the power and also spectral shape of Raman amplification pumping light supplied to the Raman amplification optical fiber 61. The power and spectral shape of the Raman amplification pumping light are controlled such that the gain spectrum of Raman amplification of signal light in the Raman amplification optical fiber 61 is kept flat and constant in the signal light wavelength band.

As described above, in the Raman amplifier 6 according to this embodiment, Raman amplification pumping light output from the pumping light source unit 63 has a spectrum in a wide band. In addition, the spectrum of the Raman amplification pumping light is controlled by the control section 64 by controlling the output power of each of the pumping light sources 631c and 632c (and also the loss spectrum of the optical filter 633). Thus, the gain spectrum of Raman amplification of signal light in the Raman amplification optical fiber 61 is kept flat and constant in the signal light wavelength band.

In the Raman amplifier 6 according to this embodiment, since the pumping light source having the output spectrum as described above is employed, the number of pumping light sources can be made smaller than that in the prior art described in reference 1, and hence, the gain spectrum flattening can easily be controlled. In the Raman amplifier 6 according to this embodiment, since the gain spectrum can be flattened without using any gain equalizer, the gain spectrum flattening can easily be controlled, as compared to the prior art described in reference 2.

In this embodiment, an optical circulator may be used in place of the optical coupler 62. Instead of back pumping, forward pumping or two-way pumping may be employed. In addition, optical fibers doped with another rare earth element (e.g., Nd or Pr) may be used in place of the EDFs 631a and 632a. In this case, light sources for outputting pumping light having a wavelength capable of exciting the rare earth element are used as the pumping light sources 631c and 632c.

The present invention is not limited to the above embodiments, and various changes and modifications can be made. For example, signal light may be optically amplified using not only the Raman amplifier according to each embodiment but also a rare-earth-element-doped optical fiber amplifier (preferably an Er-doped optical fiber amplifier).

As has been described above in detail, according to the present invention, since the spectrum of light output from each of N pumping light sources included in the Raman amplification pumping light supply means is non-unimodal, or the spectrum is changeable (controllable) and is controlled by the control means, the number of pumping light sources can be made smaller than that in the prior art, and the gain spectrum flattening can easily be controlled. In addition, the Raman amplifier can flatten the gain spectrum without using any gain equalizer. Also from this viewpoint, the gain spectrum flattening can easily be controlled as compared to the prior art.

The power or spectrum of Raman amplification pumping light output from each of the N pumping light sources can be controlled by the control means, e.g., on the basis of the power of Raman amplification pumping light, which is detected by a residual pumping light power detection means, on the basis of the level of each of signal light components with different wavelengths, which is detected by a signal light level detection means, on the basis of the longitudinal loss distribution of the Raman amplification optical fiber, which is detected by an optical fiber loss distribution detection means, on the basis of the level of pilot light, which is detected by a pilot light level detection means, on the basis of the input signal light power and output signal light power, or on the basis of the wavelength of signal light, which is detected by a signal light wavelength detection means. With this arrangement, the gain spectrum of Raman amplification of signal light in the Raman amplification optical fiber can be kept flat and constant in the signal light wavelength band.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A Raman amplifier characterized by comprising:
a Raman amplification optical fiber for transmitting signal light and Raman-amplifying the signal light upon receiving Raman amplification pumping light; and
Raman amplification pumping light supply means, having N (N≧1) pumping light sources for outputting light having a non-unimodal spectrum, for supplying light components output from the N pumping light sources to said Raman amplification optical fiber as the Raman amplification pumping light, wherein the spectrum of light output from each pumping light source is non-unimodal.

2. An amplifier according to claim 1, characterized by further comprising:
residual pumping light power detection means for detecting a power of the Raman amplification pumping light remaining after propagation through said Raman amplification optical fiber; and
control means for controlling a power of the Raman amplification pumping light output from each of the N pumping light sources on the basis of the power of the Raman amplification pumping light, which is detected by said residual pumping light power detection means.

3. An amplifier according to claim 1, characterized by further comprising:
signal light level detection means for detecting level of each of signal light components with different wavelengths after propagation through said Raman amplification optical fiber; and
control means for controlling a power of the Raman amplification pumping light output from each of the N pumping light sources on the basis of the level of each of the signal light components with the different wavelengths, which is detected by said signal light level detection means.

4. An amplifier according to claim 1, characterized by further comprising:
optical fiber loss distribution detection means for detecting a longitudinal loss distribution of said Raman amplification optical fiber; and
control means for controlling a power of the Raman amplification pumping light output from each of the N pumping light sources on the basis of the longitudinal loss distribution of said Raman amplification optical fiber, which is detected by said optical fiber loss distribution detection means.

5. An amplifier according to claim 1, characterized by further comprising:
pilot light level detection means for detecting level of pilot light transmitted together with the signal light after propagation through said Raman amplification optical fiber; and
control means for controlling a power of the Raman amplification pumping light output from each of the N pumping light sources on the basis of the level of the pilot light, which is detected by said pilot light level detection means.

6. An amplifier according to claim 1, characterized by further comprising:
input signal light power detection means for detecting a power of signal light input to said Raman amplification optical fiber;
output signal light power detection means for detecting a power of signal light output from said Raman amplification optical fiber; and
control means for controlling a power of the Raman amplification pumping light output from each of the N pumping light sources on the basis of the input signal light power detected by said input signal light power detection means and the output signal light power detected by said output signal light power detection means.

7. An amplifier according to claim 1, characterized by further comprising:
signal light wavelength detection means for detecting a wavelength of the signal light input to said Raman amplification optical fiber; and
control means for controlling a power of the Raman amplification pumping light output from each of the N pumping light sources on the basis of the signal light wavelength detected by said signal light wavelength detection means whether each of the N pumping light sources is to output the Raman amplification pumping light.

8. An amplifier according to claim 1, characterized in that
one of the N pumping light sources includes a rare-earth-element-doped optical fiber in which a rare earth element is doped in an optical waveguide region, and rare earth element pumping light supply means for supplying a rare earth element pumping light for exciting the rare earth element to said rare-earth-element-doped optical fiber, and spontaneous emission light generated and amplified by said rare-earth-element-doped optical fiber as the rare earth element pumping light is supplied from said rare earth element pumping light supply means is used as the Raman amplification pumping light.

9. An amplifier according to claim 8, characterized in that a plurality of stages of said rare-earth-element-doped optical fibers are connected.

10. An amplifier according to claim 8, characterized in that one of the N pumping light sources further includes an optical filter for adjusting a spectrum of the amplified spontaneous emission light to be supplied to said Raman amplification optical fiber as the Raman amplification pumping light.

* * * * *